(12) United States Patent
Bain et al.

(10) Patent No.: US 7,371,300 B2
(45) Date of Patent: May 13, 2008

(54) ADHESIVE COMPOSITION COMPRISING THERMOEXPANDABLE MICROCAPSULES

(75) Inventors: Peter Stewart Bain, Wakefield (GB); Giovanni Manfre, Verona (IT)

(73) Assignee: De-Bonding Limited, Jersey (GB)

( * ) Notice: Subject to any disclaimer, the term of this patent is extended or adjusted under 35 U.S.C. 154(b) by 0 days.

(21) Appl. No.: 10/909,098

(22) Filed: Jul. 30, 2004

(65) Prior Publication Data

US 2005/0016675 A1 Jan. 27, 2005

(51) Int. Cl.
*B29C 63/48* (2006.01)
*B29C 65/76* (2006.01)
*B32B 37/26* (2006.01)
*B32B 38/10* (2006.01)

(52) U.S. Cl. ................... 156/247; 156/344

(58) Field of Classification Search ........... 156/79, 156/81, 87, 108, 109, 247, 278, 305, 307.1, 156/344, 547; 428/85, 364, 372
See application file for complete search history.

(56) References Cited

U.S. PATENT DOCUMENTS

| | | | | |
|---|---|---|---|---|
| 3,615,960 | A | * | 10/1971 | Hoshii et al. ............. 156/49 |
| 3,788,555 | A | * | 1/1974 | Harrison et al. .......... 239/336 |
| 3,864,181 | A | * | 2/1975 | Wolinski et al. .......... 156/79 |
| 4,320,076 | A | * | 3/1982 | Greenwood ............... 264/35 |
| 4,847,977 | A | * | 7/1989 | Gold ........................ 29/446 |
| 4,946,529 | A | * | 8/1990 | Huddleston ............... 156/187 |
| 5,064,494 | A | | 11/1991 | Duck et al. ............. 156/273.5 |
| 5,476,712 | A | | 12/1995 | Hartmann et al. |
| 5,609,954 | A | * | 3/1997 | Aizawa et al. .......... 428/317.5 |
| 5,695,837 | A | | 12/1997 | Everaerts et al. |
| 5,712,317 | A | | 1/1998 | Makhlouf et al. |
| 6,103,152 | A | | 8/2000 | Gehlsen et al. |
| H1949 | H | * | 3/2001 | Hansen et al. ........... 524/505 |
| 6,440,185 | B2 | * | 8/2002 | Nagata et al. .......... 51/298 |

2006/0219350 A1 10/2006 Bain et al.

FOREIGN PATENT DOCUMENTS

| | | |
|---|---|---|
| EP | 0 521 825 A2 | 1/1993 |
| EP | 0527505 | 2/1993 |
| EP | 0 717 091 A2 | 6/1996 |
| EP | 959118 | 11/1999 |
| EP | 1 185 594 B1 | 3/2005 |
| GB | 1044680 | 10/1966 |
| JP | 56-61468 | 5/1981 |
| JP | 4-63885 | 2/1992 |
| JP | 4-292684 | 10/1992 |
| JP | 07145355 A * | 6/1995 |
| WO | WO 95/24441 | 9/1995 |

OTHER PUBLICATIONS

English abstract of JP 07-145355.*
Machine English Translation of JP 07-145355.*
Sakurai et al. 1998. "Evaluation of Adhesion Properties of Elastomeric Adhesive" *Reports of theShizuoka Industrial Research Institute of Shizuoka Prefecture* 43:10-16. (Including copy of English translation).
File history of European patent application No. EP 00931451.9, filed May 26, 2000, including a copy of each document submitted to the EPO from Dec. 12, 2005 forward and a print out of all documents in this file history as shown on the EPO website as of Oct. 17, 2007.
European Non-binding Opinion of the Opposition Division for Application No. 00931451.9 (3 pages) (Nov. 14, 2007).

* cited by examiner

*Primary Examiner*—Philip Tucker
*Assistant Examiner*—Sing P. Chan
(74) *Attorney, Agent, or Firm*—Myers Bigel Sibley & Sajovec, P.A.

(57) ABSTRACT

The invention relates to a composition, its use and a method of its use as a glazing adhesive. The composition comprises an adhesive agent with thermoexpandable microcapsules which act as pressure actuators dispersed therein. The microcapsules are heat triggered so as to release at least one expandable volatile agent encapsulated within the microcapsule shell.

39 Claims, No Drawings

ADHESIVE COMPOSITION COMPRISING THERMOEXPANDABLE MICROCAPSULES

RELATED APPLICATIONS

This application claims priority to prior application Ser. No. 09/980,219, filed Apr. 18, 2002 which is a 35 U.S.C. § 371 National Phase Application of International Application Ser. No. PCT/GB00/02059, (published under PCT Article 21(2) in English), filed on May 26, 2000, which claims priority to Great Britain Application Ser. No. 9912694.8, filed on Jun. 2, 1999, the disclosures of which are incorporated by reference herein in their entireties.

The present invention relates to an adhesive for use in sealing together two surfaces, for use especially in the glazing industry in general and in securing vehicle windscreens and/or windows and/or other vehicle features that may require replacement such as, without limitation, car panels; the invention also provides a method of use for installing and/or replacing vehicle windscreens and/or other fixed glazing on vehicles, buildings or the like.

BACKGROUND OF THE INVENTION

Typically to install a window pane in a wooden/plastic/metal frame, the glass pane is firstly held in position against nails or other clasps and then fixed into position by putty or plasters material. Conventional putty is a cement made from whiting and linseed oil which hardens over time to provide a peripheral rim of the window pane, thus separating interior and exterior environments and preventing air, moisture and/or heat transfer. The installation is completed once the putty has dried and this usually takes up to 6 hours or so depending on the kind of plasters used.

To remove a window pane after it has been fixed in position in a frame requires the window itself to be shattered so that the hardened putty or plasters can be scraped/chiselled away from the fame. The removal operation can cause damage to the frame and varnishes.

In use, the window pane is held rigidly around its edges so that even relatively small vibrational mechanical movements such as with earthquakes or bomb blasts or strong winds can cause the window pane to shatter.

In the automotive industry, cars direct from the factory production line typically have the windscreens and other fixed windows, including light assemblies fixed into position by placing the glass against a frame rim and using adhesives so as to direct glaze the glass. The life span of a windscreen and other fixed windows are significantly shorter than that of the vehicle itself partially due to degradation or damage or being deliberately broken by vandals/car thieves. Thus a motorist may need to replace the windscreen several times during the vehicle's lifetime.

Additionally, glued glazings have to be replaced any time the window, especially the windscreen, has been damaged in its optical performance by, for example, impact stones or other fractures or abrasion by wipers. Damage to the window surface can increase the scattering of light and may reduce the visibility to levels below safety limits. Moreover, regulations of motor worthiness (MOT) stipulate that there can be no chips or visual impairments on laminated windscreens, so whereas recent improvements have made the windscreens shatter-proof, they are still prone to chipping and fracturing and thus will require replacement.

The process of replacing vehicle windscreens is both laborious and time consuming. The automotive glass fitter has first to remove the defective windscreen (usually in intact form), however the windscreen is firmly bonded in place and the adhesive sealant is hardened. Typically the fitter uses a device comprising a cheesewire. The cheesewire is used to cut/saw through the hardened rubber along the periphery of the windscreen. This process requires physical force and can lead to musculo-skeletal conditions in the fitters themselves as a result of repetitive strain injury. Further problems associated with this method are that the cheesewires can overheat due to friction, additionally the wires themselves can break.

Other methods of detaching the windscreen from the adhesive sealant include: the use of mechanical oscillator knives/cutters to cut through the hardened material or; directed heat such as a laser beam to soften the sealant prior to removing the windscreen with either cheesewire or specialised bladed tools. The problem with a method where heat is directly applied to the sealant is that the heat required to soften the hardened adhesive sealant can concomitantly and inadvertently damage the vehicle's paintwork and/or other exterior surfaces. For example, a pulsed laser that is set to pulse too fast will not generate enough energy to char the adhesive sealant and a pulsed laser that is set too slow will burn the adhesive sealant and liquify it.

Once the windscreen has been freed from the rubber sealant it can be removed and the surround scraped before it is replaced. It is known from the prior art to use urethane based adhesives to fix/seal the replaced windscreen in place and to apply the adhesive from a dispenser gun to specific peripheral edges so as not to impinge on the viewing capacity of the windscreen. The adhesive typically takes about 8 hours to cure.

Recent advances to the industry have provided for the inclusion of fast cure agents/catalysts so as to speed up the time from vehicle drop-off to vehicle collection. The fast cure agents/catalysts can be provided pre-mixed in the adhesive composition or alternatively can be mixed with the adhesive at the point of exit from a dispensing gun. However the problem still remains that the removal of a defective windscreen and its subsequent replacement is a laborious and time consuming process which can result in damage to the dashboard interior or vehicle paint-work.

An adhesive that could satisfy vehicle safety crush and crash standards and provide for easy, effective and damage-proof removal of a defective windscreen or other fixed glazing from a vehicle would offer immediate improvement to the industry and consumer.

In a completely different technical field it is known to provide thermoexpandable microcapsules or microspheres for use in the manufacture of porous or lightweight materials with density (weight) reduction, acoustic and thermal insulating properties as covering materials or walls. The microcapsules or microcapsules comprises a polymer shell or shell of some other similar material, the shell being of certain thickness and chemical/physical/mechanical properties. The shell encapsulates materials such as volatile organic solvents, expandable gases or activating agents, including explosives or any other such material which is capable of exploding the shell and expanding at certain specified conditions with a selected matrix. The microcapsules, when heated to a sufficient temperature, typically in the region of about 75-180° C., depending on the encapsulated substance and the shell composition and thickness, can produce an increase of their volume at high expansion rate in some instances at a volumetric expansion limit of up to 70 to 160 times the original volume. The percentage and distribution of the microspheres in a given composition, their expansion ratio, the temperature operating range, the softening transition range of the shell material and the matrix cohesion and consistency are all parameters which are able to influence the expansion volume of a layer between two materials.

We have discovered that by mixing an appropriate adhesive in a suitably rheological performance with a certain % in powdered form of specially developed microcapsules having a specific range of size distribution, the resulting composition is effective at providing glazing adhesion and sealing. Moreover, of particular advantage is that the adhesive bonds in the composition can be weakened by the application of direct heat to the composition thereby allowing sufficient softening of the adhesive material so that a vehicle windscreen/fixed glazing can be easily lifted up and so rapidly removed. The lifting pressure can be predicted by a computational software which is part of this invention and treats the expanding microspheres like a spring mechanical pressure actuator in the volume of the adhesive state and like a "bombing" actuator at interfaces between two layers.

We believe that the invention provides the first application/use of a polyester material in the automotive glazing industry.

It will be appreciated that the adhesive of the invention has application in other areas especially where two surfaces are to be bonded together and where one surface may subsequently need replacing following damage or ware, for example, and without limitation; shower doors and vehicle panels and other building glazing applications.

Reference herein to vehicle is intended to include, without limitation car, lorry, van ship, boat, plane, cable car, helicopter, hovercraft and any other form of transport in which there is fixed glazing.

STATEMENT OF THE INVENTION

In its broadest aspect the invention provides a composition comprising a heat triggered adhesion-deactivating microcapsule or microsphere or microbead, typically the microcapsule or microsphere or microbead is typically dispersed in another medium such as an adhesive or primer or at an interface between two layers.

According to a first aspect of the invention there is provided a composition comprising an adhesive agent and dispersed therein thermoexpandable microcapsules.

Reference herein to microcapsule is intended to include a microsphere or microbead.

Preferably, the microcapsules each comprise a shell which encapsulates at least one expandable gas or volatile expandable agent or an explosive material. Preferably, the shell is composed of a polymer or other suitable material.

Preferably, the adhesive agent is a urethane or polyurethane or polyvinylchloride or a MS polymer.

Preferably, the thermoexpandable capsules are microspheres or hollow fibres in the form of a powder of specific range of dimensions and properties.

The powder can be provided with the adhesive agent in a pre-mixed form in a container or the powder can be introduced into and mixed with the adhesive or one component of it at a point of exit from a dispensing device i.e. the composition can be formed as a pre-mix or at the time of, or shortly before, its use. The dispensing device can be followed by a static mixer suitably lubricated at the point of exit of the composition for optimal blending.

Preferably, the composition additionally comprises a fast cure agent or catalyst, whereby the adhesive composition is rapidly cured or set. Preferably, the composition comprises a colouring agent so that the cured composition is black.

Reference herein to cure is intended to mean the hardening or setting of the adhesive mixture, the hardening or setting can be either chemically or non-chemically enhanced.

Preferably, the microcapsules encapsulate more than one material, ideally the material is selected from the group consisting of an expanding agent, an agent capable of sublimation, water, an explosive material or an activator agent.

Preferably, the activator agents are capable of foaming or of shrinkage. The present invention includes the simultaneous use of microcapsules encapsulating a variety of different agents, either separately or in combination. The additional microcapsules are activated by the breaking or permeation of the polymer shell whereby their contents are released so as to interact with the adhesive mix. Their activation is as a result of specified applied conditions and thus is controllable. Microspheres do not break/fracture their shells in the expanding state maintaining their integrity, so that an activated composition comprises intact expanded microspheres and microcapsules which have released their contents into the matrix composition.

It will be appreciated that the expanding agent inside the capsule is capable of activating a foaming process of the adhesive composition and that the agent capable of sublimation is to allow the composition to expand under certain specified conditions. Both these processes will occur after the breakage/fracture of he microcapsule shell and thus contribute to facilitating lifting and ease of removing fixed glazing. The inclusion of water in the microcapsules is to allow the adhesive composition to weaken in certain conditions and the presence of an activator agent is to crosslink or polymerise the adhesive composition whereby shrinkage occurs and the adhesive composition weakens.

Preferably, the microsphere's diameter is in the range 10 to 120 μm.

Preferably, the microcapsule shell thickness is in the range 3 to 7 μm.

Preferably, the composition comprises microcapsules in the range of 1-30% by volume, and more preferably in the range of 2-10% by volume.

Preferably, the composition is activated by heat wherein the heat activation range is 80-170° C. and ideally 120-150° C.

Preferably, the composition is composed of a mixture of microcapsules of different diameter or shell thickness or of differing heat activation temperatures or different suitable expanding coefficients.

The temperature of a vehicle windscreen can reach over 100° C. in natural soak conditions. Thus the heat activation of the microcapsules in the composition of the invention needs to be in excess of any natural temperatures that may occur whilst being below those that could damage a vehicle dashboard trim or paint-work. It is envisaged that the composition of the invention will have application in many fields and many diverse climates hence the composition may be provided with selected heat activation ranges depending on its intended use and/or country of use for both kinds of microcapsule: the expanding microspheres and the microcapsules with breakable shells. For example, in the instance of the composition being used for fixing and sealing a shower door it is envisaged that the adhesive composition microcapsule heat activation range would be in the region of 80-100° C., whilst for the majority of automotive glazing the microcapsule heat activation range would be in the region of 120-150° C. Optionally in either composition a user may require microcapsules capable of releasing a curing agent and/or an activator agent capable of shrinkage.

Heat activation of the microcapsules causes the beads/fibres to thermoexpand thus creating pressure along the rim of glazing. This in effect reduces the viscosity and the shear or tear stress of the adhesive material. In addition, heat activation or expansion of the microcapsules reduces the cohesive stress and/or interfacial adhesive bonding of the adhesive film between two bonded surfaces, typically the frame and glass layers. The reduction in either cohesive stress and interfacial adhesion, or both together, contribute to reduce failure stress so as to facilitate removal of the glued glazing from the frame once the microcapsules have expanded at the specific temperature range and range of time, typically no more than 5 minutes. The compositions of the present invention thus allows removal of glued glazing by virtue of a reduction in chemical and/or physical bonding of the adhesion at the interface between the adhesive and the two bonded surfaces (glass and frame surfaces). In other words, adhesion failure can only occur at the interface of the two bonded surfaces due to the effect of the expanded microcapsules. In use, and once the microcapsules have been activated the reduction in cohesive forces of the adhesive material and the bonding at interface between material and layers in addition to the expansion of the adhesive material itself, results in the loosening of the whole of the adhesion of the glazing to a frame so that a windscreen or glazing can be easily lifted up and removed therefrom.

According to a further aspect of the invention there is provided use of a composition comprising an adhesive agent and dispersed therein thermoexpandable microcapsules as a glazing adhesive.

Preferably, the composition further includes any one or more of the features herein before described.

According to a yet further aspect of the invention there is provided a composition comprising a primer and dispersed therein thermoexpandable microcapsules.

Preferably, the composition further includes any one or more of the features herein before described.

According to a further aspect of the invention there is provided use of a composition comprising a primer and dispersed therein thermoexpandable microcapsules as a glazing adhesive.

Preferably, the composition further includes any one or more of the features herein before described.

It will be appreciated that the invention also includes the use of microcapsules when applied directly to a glazing face and/or body of a vehicle.

According to a yet further aspect of the invention there is provided a method of installing and/or replacing a vehicle windscreen or fixed glazing comprising the steps of:
 (i) placing a windscreen flush against a window aperture rim of a vehicle,
 (ii) applying the composition of the first aspect of the invention around a peripheral region of the windscreen;
 (iii) allowing sufficient time for the adhesive to cure;
 (iv) applying a heat source to the cured adhesive wherein the heat applied is sufficient to cause thermoexpansion of the microcapsules and thus weaken the adhesive cohesion and interface bonds of the composition; and
 (v) removing the windscreen from the main vehicle body.

It will be appreciated that in one aspect, the method of installation involves steps i-iii whilst in another aspect the method of replacement involves steps iv-v.

By using the method of the invention as herein described, a vehicle windscreen or fixed glazing can be removed and/or replaced more rapidly and advantageously with less damage to the frame and/or paint work than by prior art methods, thus the method is more cost effective to both the fitter and customer.

The invention claimed is:

1. A method of removing a vehicle windscreen or a vehicle panel which is bonded to a vehicle surface with an adhesive system comprising a primer containing thermoexpandable microcapsules, wherein the primer does not contain an adhesive agent, comprising the steps of:
 (i) applying a heat source to the adhesive system sufficient to cause thermoexpansion of the thermoexpandable microcapsules in the primer whereby the thermoexpanding microcapsules act as pressure activators and thereby alter the structure of the primer at the bonded surfaces by reducing the adhesive cohesion and interface bonds of the adhesive system; and
 (ii) removing the windscreen or vehicle panel from the vehicle surface.

2. The method according to claim 1, wherein thermoexpansion of the microcapsules is triggered at a temperature in the range of 80-170° C.

3. The method of claim 2, wherein the trigger temperature is about 165° C.

4. The method of claim 2, wherein the microcapsules are present in the primer at about 7% by volume.

5. A method for separating two surfaces that have been bonded together by an adhesive system comprising a primer containing thermoexpandable microcapsules, wherein the primer does not contain an adhesive agent, comprising:
 applying heat to the adhesive system to allow the thermoexpandable microcapsules to expand and act as pressure activators and thereby alter the structure of the primer at the bonded surfaces by reducing chemical and/or physical bonds therebetween to facilitate separation of one surface from the other.

6. The method according to claim 5, wherein each thermoexpandable microcapsule comprises a shell which encapsulates at least one expandable gas.

7. The method according to claim 6, wherein the shell is composed of a polymer.

8. The method according to claim 5, wherein each thermoexpandable microcapsule comprises a shell which encapsulates at least one volatile expandable agent.

9. The method according to claim 5, wherein each thermoexpandable microcapsule comprises a shell which encapsulates at least one explosive material.

10. The method according to claim 5, wherein the adhesive system additionally comprises:
 a fast cure agent or catalyst and/or;
 a coloring agent so that the composition is black.

11. The method according to claim 5, wherein the diameter of the thermoexpandable microcapsules is in the range 10 to 120 μm.

12. The method according to claim 5, wherein the shell thickness of the thermoexpandable microcapsules is in the range 3 to 7 μm.

13. The method according to claim 5, wherein the microcapsules are present in the primer in the range of 1-30% by volume.

14. The method according to claim 13, wherein the microcapsules are present in the primer in the range of 2-10% by volume.

15. The method of claim 13, wherein the microcapsules are present in the primer at about 7% by volume.

16. The method according to claim 5, wherein the adhesive system comprises a mixture of thermoexpandable microcapsules of different diameter or shell thickness or of differing heat activation temperatures or different expanding coefficients.

17. The method according to claim 5, wherein the thermoexpandable microcapsules comprise microspheres which do not fracture their shells during expansion.

18. The method according to claim 5, wherein the adhesive system is activated by heat in a heat activation range of 80-170° C.

19. The method according to claim 5, wherein the adhesive system is heated to a temperature in the range of 120-150° C.

20. The method according to claim 5, wherein the thermoexpandable microcapsules in the form of a powder are pre-mixed with the primer to form a premix.

21. The method of claim 5, wherein the adhesive system is heated to a temperature of about 165° C.

22. A method for bonding and de-bonding two surfaces of a vehicle comprising:
administering an adhesive system comprising thermoexpandable microcapsules in a primer, wherein the primer does not contain an adhesive agent, to the surfaces so as to bond said surfaces; and
removing one of the bonded surfaces from the adhesive system by applying heat to the adhesive system to allow the thermoexpandable microcapsules to expand and facilitate removal of the primer from an adhesive in the adhesive system, wherein thermoexpandable microcapsules in the form of a powder are pre-mixed with the primer to form a premix in a container.

23. The method according to claim 22, wherein microcapsules in the form of a powder are introduced into and mixed with the primer at a point of exit from a dispensing device.

24. The method according to claim 22, wherein at least one of the surfaces is glazing.

25. A method for de-bonding two surfaces that have been bonded together with an adhesive system comprising thermoexpandable microcapsules in a primer, wherein the primer does not contain an adhesive agent, comprising:
removing one of the bonded surfaces from the adhesive system by applying heat to the adhesive system to allow the thermoexpandable microcapsules to expand and facilitate removal of the primer from an adhesive in the adhesive system, wherein thermoexpandable microcapsules in the form of a powder are introduced into and mixed with the primer at a point of exit from a dispensing device.

26. A method for expanding thermoexpandable microcapsules in a layer of an adhesive system positioned between an interface of two surfaces of vehicle body parts, so as to separate said parts, comprising:
administering the adhesive system comprising thermoexpandable microcapsules in a primer, wherein the primer does not contain an adhesive agent, at the interface of the two surfaces; and
heating said adhesive system to create a heat-triggered bonding reduction of the system whereby the thermoexpandable microcapsules act as pressure activators, thereby altering the structure of the primer at the bonded surfaces by reducing chemical andlor physical bonds at the interface of the two surfaces.

27. The method according to claim 26, wherein each microcapsule comprises a shell which encapsulates at least one expandable gas or volatile expandable agent.

28. The method according to claim 27, wherein the shell is composed of a polymer.

29. The method according to claim 27, wherein the shell thickness of the thermoexpandable microcapsules is in the range 3 to 7 μm.

30. The method according to claim 26, wherein the adhesive system further includes:
a fast cure agent or catalyst and/or;
a coloring agent so that the composition is black.

31. The method according to claim 26, wherein the diameter of the thermoexpandable microcapsules is in the range 10 to 120 μm.

32. The method according to claim 26, wherein the microcapsules are present in the primer in the range of 1-30% by volume.

33. The method according to claim 26, wherein the microcapsules are present in the primer in the range of 2-10% by volume.

34. The method according to claim 26, wherein the bonding reduction is triggered at a temperature in the range of 80-170° C.

35. The method according to claim 34, wherein the bonding reduction is triggered at a temperature in the range of 120-150° C.

36. The method of claim 34, wherein the bonding reduction is triggered at a temperature of about 165° C.

37. The method according to claim 26, wherein the adhesive system comprises a mixture of thermoexpandable microcapsules of different diameter or shell thickness or of differing heat activation temperatures or different expanding coefficients.

38. The method according to claim 26, wherein the thermoexpandable microcapsules are microspheres which do not fracture their shells during expansion.

39. The method of claim 26, wherein the microcapsules are present in the primer at about 7% by volume.

* * * * *

UNITED STATES PATENT AND TRADEMARK OFFICE
CERTIFICATE OF CORRECTION

PATENT NO. : 7,371,300 B2 Page 1 of 1
APPLICATION NO. : 10/909098
DATED : May 13, 2008
INVENTOR(S) : Bain et al.

It is certified that error appears in the above-identified patent and that said Letters Patent is hereby corrected as shown below:

Column 8, Line 9, Claim 26:   Please correct "andlor"
                              To read -- and/or --

Signed and Sealed this

Nineteenth Day of August, 2008

JON W. DUDAS
*Director of the United States Patent and Trademark Office*